United States Patent
Hasegawa et al.

(10) Patent No.: US 12,459,023 B2
(45) Date of Patent: Nov. 4, 2025

(54) WELDING MONITORING APPARATUS AND WELDING MONITORING METHOD

(71) Applicant: NIPPON STEEL CORPORATION, Tokyo (JP)

(72) Inventors: Noboru Hasegawa, Tokyo (JP); Michitoshi Tanimoto, Tokyo (JP); Michimasa Mukai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/456,314

(22) Filed: Aug. 25, 2023

(65) Prior Publication Data

US 2024/0082900 A1 Mar. 14, 2024

Related U.S. Application Data (62) Division of application No. 16/331,067, filed as application No. PCT/JP2016/083135 on Nov. 8, 2016, now abandoned.

(51) Int. Cl.
*B21C 51/00* (2006.01)
*B21C 37/08* (2006.01)
(Continued)

(52) U.S. Cl.
CPC .............. *B21C 51/00* (2013.01); *B21C 37/08* (2013.01); *B21C 37/0818* (2013.01);
(Continued)

(58) Field of Classification Search
CPC ... B21C 37/08; B21C 37/0818; B23K 11/062; B23K 11/0873; B23K 11/252;
(Continued)

(56) References Cited

U.S. PATENT DOCUMENTS

2003/0057258 A1   3/2003   Ishida et al.
2010/0232678 A1*  9/2010   Hasegawa ............... B21C 37/08
                                                              382/141

FOREIGN PATENT DOCUMENTS

CA     2870427 A1 *  10/2013  ............. B21B 37/74
CN     101610869 A    12/2009
(Continued)

OTHER PUBLICATIONS

Chinese Office Action and Search Report for counterpart Chinese Application No. 201680089069.3, dated Nov. 1, 2019, with English translation.
(Continued)

*Primary Examiner* — Steven W Crabb
*Assistant Examiner* — Alba T Rosario-Aponte
(74) *Attorney, Agent, or Firm* — Birch, Stewart, Kolasch & Birch, LLP (57) ABSTRACT

Provided is a welding monitoring apparatus that monitors a welding state of a V-convergence region in which a strip-shaped metal sheet is converged in a V-shape, when the metal sheet is cylindrically formed while being conveyed, and both side edges of the metal sheet are heated and melted in a manner of being butted each other while being converged in the V-shape, such that an electric resistance welded steel pipe is manufactured. This welding monitoring apparatus includes an image capturing unit that captures images of a region including the V-convergence region in time series; and an image processing unit that extracts a welding point based on the images captured in time series and detects the presence or absence and a position of irregular arcing at the welding point or on an upstream side of the welding point.

8 Claims, 7 Drawing Sheets

(51) Int. Cl.
  *B23K 11/06* (2006.01)
  *B23K 11/087* (2006.01)
  *B23K 11/25* (2006.01)
  *B23K 13/02* (2006.01)
  *B23K 13/08* (2006.01)
  *B23K 31/00* (2006.01)
  *B23K 31/12* (2006.01)
  *G01N 21/892* (2006.01)
  *G01N 21/952* (2006.01)
  *G01N 29/04* (2006.01)

(52) U.S. Cl.
  CPC ........ *B23K 11/062* (2013.01); *B23K 11/0873* (2013.01); *B23K 11/252* (2013.01); *B23K 13/02* (2013.01); *B23K 13/08* (2013.01); *B23K 31/003* (2013.01); *B23K 31/125* (2013.01); *G01N 21/892* (2013.01); *G01N 21/952* (2013.01); *G01N 29/041* (2013.01); *G01N 29/043* (2013.01); *G01N 2291/267* (2013.01)

(58) Field of Classification Search
  CPC .... B23K 13/02; B23K 13/025; B23K 31/027; B23K 31/003; B23K 31/125
  USPC ..................................... 219/61.2, 59.1, 60.2
  See application file for complete search history.

(56) References Cited

FOREIGN PATENT DOCUMENTS

| | | | | | |
|---|---|---|---|---|---|
| CN | 101909802 | A | 12/2010 | | |
| JP | 52-123948 | A | 10/1977 | | |
| JP | 9-168819 | A | 6/1997 | | |
| JP | 2009-72788 | A | 4/2009 | | |
| JP | 2009-255132 | A | 11/2009 | | |
| JP | 4705692 | B2 | 6/2011 | | |
| JP | 2012-106271 | A | 6/2012 | | |
| JP | 5440014 | B2 | 3/2014 | | |
| JP | 2016-78056 | A | 5/2016 | | |
| WO | WO 2009/057830 | A1 | 5/2009 | | |
| WO | WO-2013069748 | A1 | * | 5/2013 | ............. B21C 37/08 |
| WO | WO-2009057830 | A9 | * | 6/2013 | ............. B21C 37/08 |
| WO | WO-2014077812 | A1 | * | 5/2014 | ........... B23K 20/123 |
| WO | WO-2015152059 | A1 | * | 10/2015 | ............. B21C 37/08 |

OTHER PUBLICATIONS

Final Office Action issued in U.S. Appl. No. 16/331,067 on Feb. 17, 2023.
International Search Report for PCT/JP2016/083135 mailed on Feb. 7, 2017.
Non-Final Office Action issued in U.S. Appl. No. 16/331,067 on Jun. 12, 2023.
Non-Final Office Action issued in U.S. Appl. No. 16/331,067 on Oct. 28, 2022.
Restriction Requirement issued in U.S. Appl. No. 16/331,067 on Jul. 15, 2022.
Written Opinion of the International Searching Authority for PCT/JP2016/083135 (PCT/ISA/237) mailed on Feb. 7, 2017.

* cited by examiner

WELDING MONITORING APPARATUS AND WELDING MONITORING METHOD

CROSS-REFERENCE TO RELATED APPLICATIONS

This application is a Divisional of co-pending U.S. application Ser. No. 16/331,067 filed Mar. 6, 2019, which is the National Phase under 35 U.S.C. § 371 of International Application No. PCT/JP2016/083135, filed Nov. 8, 2016, all of which are hereby expressly incorporated by reference in their entirety into the present application.

TECHNICAL FIELD OF THE INVENTION

The present invention relates to a welding monitoring apparatus and a welding monitoring method for an electric resistance welded steel pipe.

RELATED ART

An electric resistance welded steel pipe is manufactured through the following step. That is, first, a strip-shaped metal sheet is continuously formed into a cylindrical shape by a roll group while being conveyed along its longitudinal direction. Then, while an upset is applied to the cylindrically formed metal sheet from its side by a pair of squeeze rolls, and while heat-input is controlled with respect to both side edges in a circumferential direction of the metal sheet converged in a V-shape, both the side edges are welded by being heated and melted through high-frequency resistance welding or induction heating welding and being butted each other. Since this step of welding an electric resistance welded steel pipe is an important step which directly affects the quality of an electric resistance welded steel pipe, various examinations have been performed in the related art.

Figure 8:
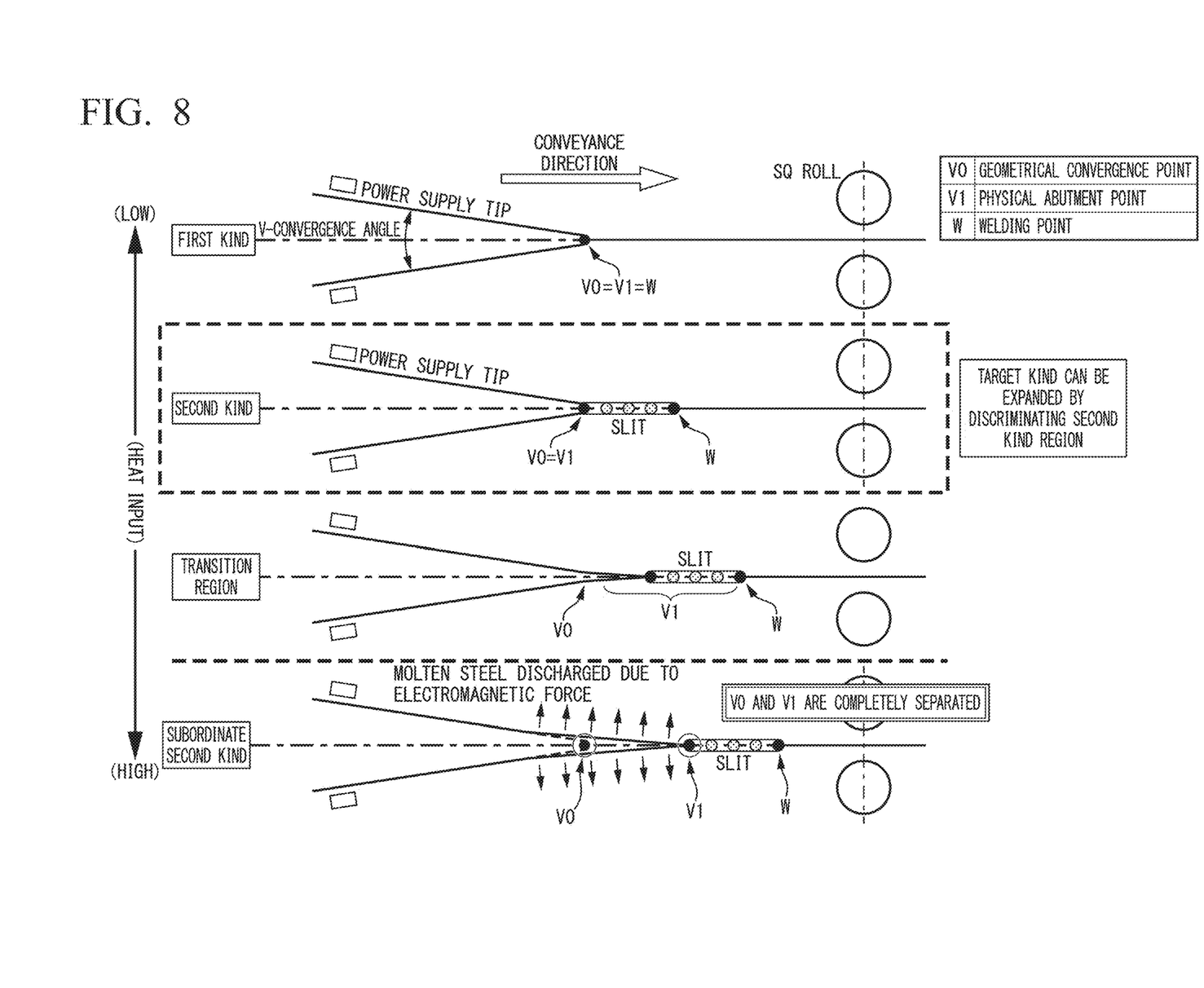
FIG. 8 is a view describing an example of a welding monitoring method in the related art, and it is a view showing each of welding phenomena of "a first kind", "a second kind", "a transition region", and "a subordinate second kind" in a welding spot.

For example, Patent Document 1 discloses that the form of a welding spot changes into "a first kind", "a second kind", "a transition region", or "a subordinate second kind" depending on the heat input amount applied at the time of welding (refer to FIG. 8). This Patent Document 1 employs an electric resistance welding work management apparatus including "an arc detecting region extraction unit that extracts a narrow region including a welding slit generated between a V-convergence point (V1) that is an abutment point at which the steel sheet abuts and a welding point (W) in which a molten steel starts to be discharged from the inside of the steel sheet, as an arc detecting region; and an arc detecting unit that detects an arc generated in the arc detecting region".

According to this constitution, it is possible to obtain a frequency of generation of an arc regularly generated (which will hereinafter be referred to as a steady state arc) on a downstream side of the V-convergence point.

Moreover, this electric resistance welding work management apparatus employs a constitution "including an arc generation frequency measuring unit that measures a frequency of generation of an arc, and a welding phenomenon determining unit that determines a welding phenomenon thereof based on whether or not the frequency of generation of an arc is equal to or greater than a predetermined value".

According to this constitution, the form of a steady state arc downstream of the V-convergence point is grasped based on the frequency of generation of the steady state arc, and thus an appropriate heat input amount is controlled.

PRIOR ART DOCUMENT

Patent Document

[Patent Document 1] Japanese Unexamined Patent Application, First Publication No. 2016-78056

According to the technology disclosed in Patent Document 1, it is possible to realize an appropriate welding state downstream of the V-convergence point. However, from the viewpoint of improving the quality of a welding spot, further amelioration is demanded.

For example, high-frequency electric resistance welding is a technology in which currents are concentrated on a welding surface such that welding is efficiently performed by utilizing a proximity effect and a skin effect of steel edges in a weld. However, when high-frequency electric resistance welding is performed, a strong electromagnetic field is formed around the steel edges due to significant currents flowing in the steel edges. Since this electromagnetic field is maximized at a welding point (V point), if a magnetic substance is present around the steel edges, it is likely to be incorporated into the welding point.

As a material of an electric resistance welded steel pipe, sometimes a steel sheet to which scale generated at the time of hot rolling adheres is adopted, and the scale is peeled off from a surface layer through a forming process or by a fin pass roll. Particularly, the fin pass roll can form a newly formed surface by scraping a welding surface. On the other hand, scale or iron powder may be generated. In addition, there is a possibility that iron powder may be similarly generated even in a pickled material in which scale seldom adheres to its surface layer. In this manner, a phenomenon, in which scale that has been peeled off or scale powder, iron powder, or the like that has been scraped is caught in a weld as a foreign substance, occurs sometimes. In this case, if a foreign substance has a large size to a certain degree, there is a possibility that it will remain on the welding surface as a solid without being melted until an upset is applied and it will become a defect without being discharged. Although the frequency of generation of a defect is not high, it degrades toughness of a weld and causes a crack at the time of working. Therefore, it is strongly demanded that a foreign substance is to be detected during pipe-making regardless of its size.

However, in the technology disclosed in Patent Document 1, the frequency of generation of a steady state arc on a downstream side of the welding point (V point) is obtained and the heat input state of welding is grasped, but countermeasures related to generation of a defect caused by a caught-in foreign substance are not provided.

DISCLOSURE OF THE INVENTION

Problems to be Solved by the Invention

The present invention has been made in consideration of the foregoing circumstances, and an object thereof is to provide a welding monitoring apparatus and a welding monitoring method, in which a relatively light caught-in defect caused by an incorporated foreign substance such as scale powder or iron powder can be detected in real time in a welding step of an electric resistance welded steel pipe.

Means for Solving the Problem

Figure 1A:
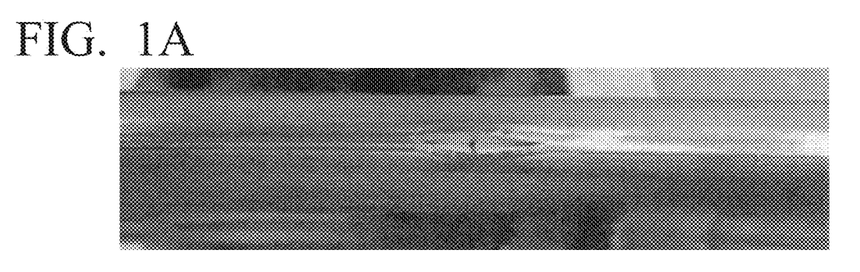
FIG. 1A shows a photograph showing an external appearance of a target defect.
Figure 1B:
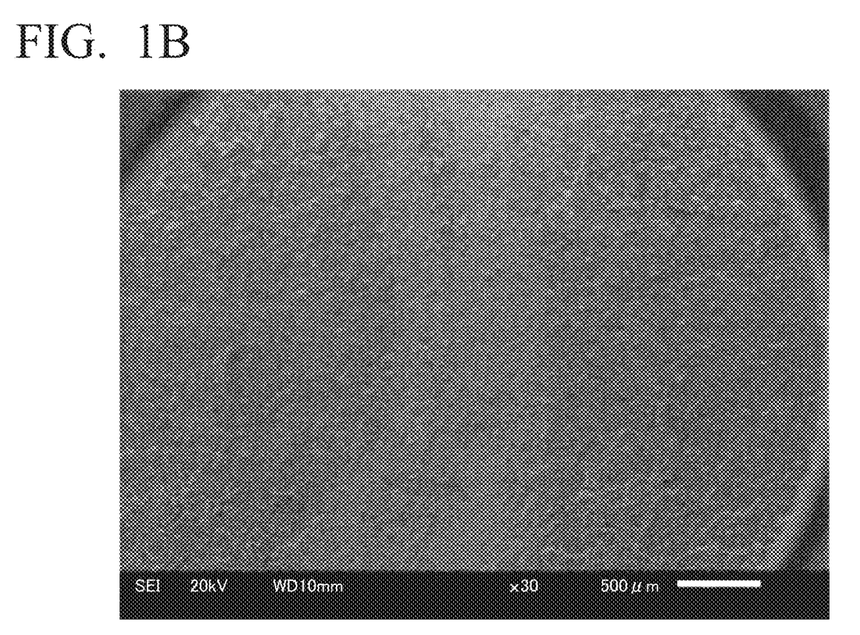
FIG. 1B is a photograph showing a secondary electron image of a target defect.

In order to gratify the foregoing object, first, the inventors have analyzed a target defect. FIG. 1A and FIG. 1B show a result obtained by installing an electric resistance welded steel pipe such that a weld of a defect-generated portion is at a 90° position in a vertical direction, and performing a flattening test for reduction in the vertical direction. FIG. 1A shows an external appearance photograph of a fracture surface having a crack, and FIG. 1B shows a secondary electron image captured by a scanning electron microscope (SEM). As shown in FIG. 1A, a defect to be regarded as a target is characterized by a slender black streak pattern present in a central position of the crack while extending in the through-thickness direction and having a width of several millimeters or smaller present. In the secondary electron image shown in FIG. 1B as well, a boundary between a black streak part and the surrounding part is manifested, and a dimple fracture surface which is characteristically formed in the surrounding part at the time of a low heat input has been observed. From the results of the flattening test described above, it is speculated that the defect has been generated due to a caught-in foreign substance which has a lower temperature than a welding surface at the time of welding and causes a heat release of the surrounding part.

Figure 2A:
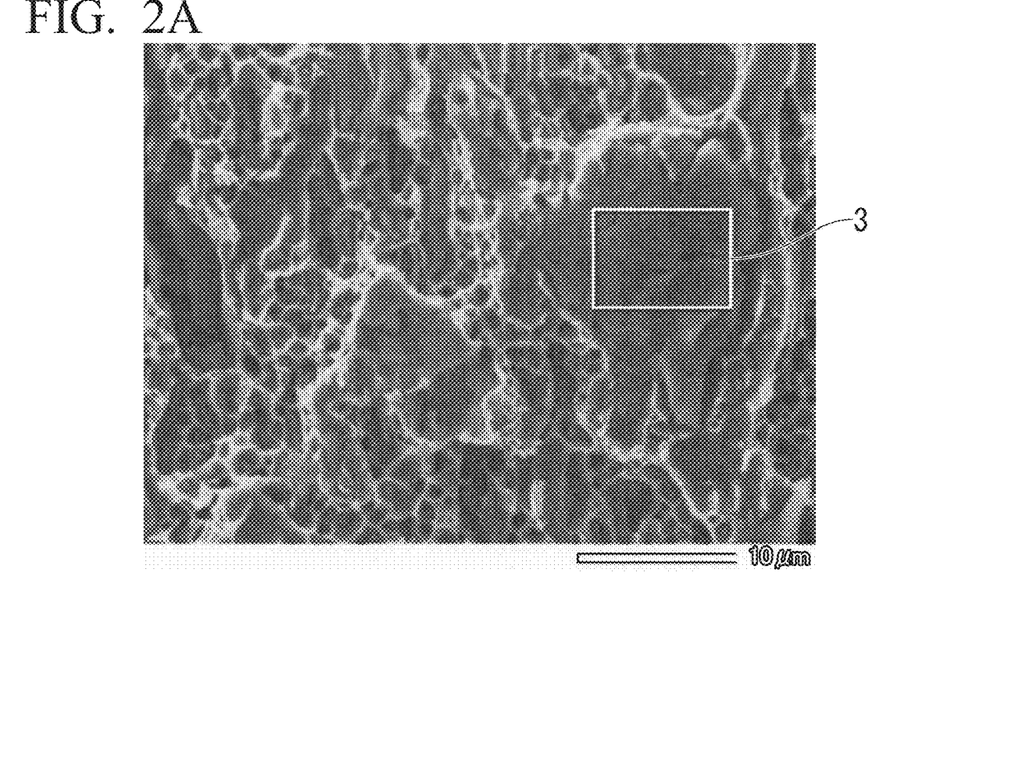
FIG. 2A is a view showing an example in which qualitative analysis is performed with respect to a target defect by using a scanning electron microscope (SEM), and it is a photograph of a backscattered electron image of a scanning electron microscope (SEM).
Figure 2B:
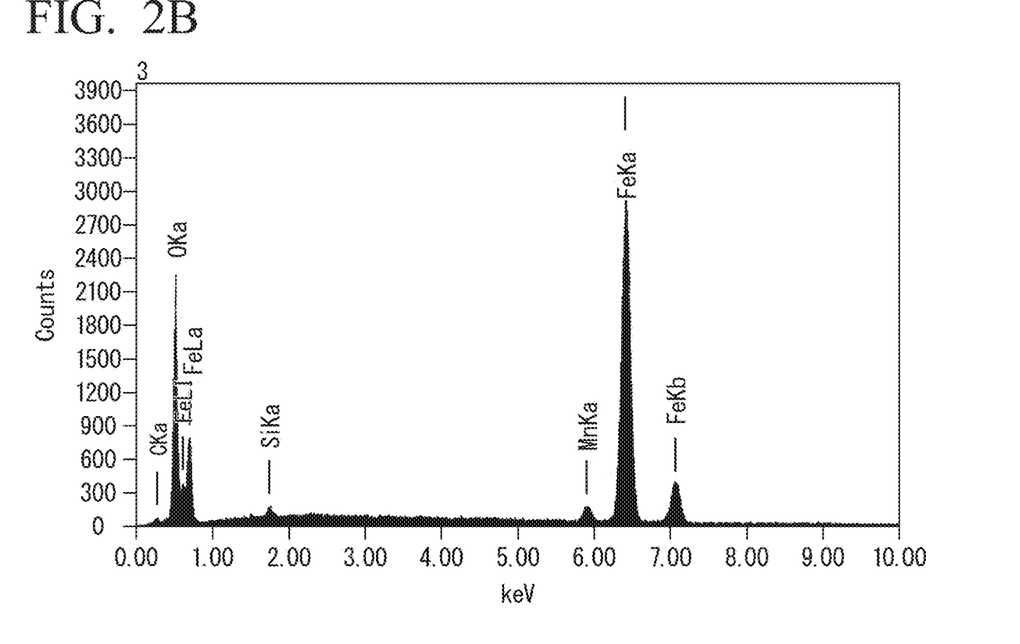
FIG. 2B is a view showing an example in which qualitative analysis is performed with respect to a target defect by using a scanning electron microscope (SEM), and it is a graph showing results of composition analysis of a portion 3 in FIG. 2A performed by using a scanning electron microscope (SEM).

Moreover, FIG. 2A and FIG. 2B show scanning electron microscope (SEM) analysis results of the black streak part. As a result of composition analysis of a portion 3 in FIG. 2A, in which the black streak part is enlarged, using a scanning electron microscope (SEM), the peaks of iron and oxygen are noticeable as shown in FIG. 2B. On the other hand, compositions other than both the elements are at a substantially noise level, and thus it is ascertained that the composition of the black streak part is iron oxide. When a plurality of places are analyzed, fine ingots of such iron oxide are scattered inside the black streak part and are highly concentrated in their entirety. Therefore, it is determined that this defect is caused due to iron oxide (scale) which has been caught in or the welding surface in which iron powder is caught in and is oxidized.

The caught-in process through which such a defect is generated has not been clarified until now. Therefore, an experiment in which a defect at the time of welding was artificially generated by using scale or iron powder was performed. At this time, a weld was cyclically image-captured by a camera installed above the weld, and comparison was performed with respect to a crack (that is, a defect-generated portion) generated through a flattening test. As a result, it has been found that there is a possibility that a foreign substance will be carried from an upstream side of a welding point while it adheres to the welding surface and will be caught in. Moreover, it has been found that if welding surfaces (edges) approach each other when a foreign substance is caught in, both the edges are short-circuited, and arcing (which will hereinafter be referred to as irregular arcing) occurs. Therefore, the inventors have invented an image processing method of automatically detecting irregular arcing by utilizing the features that this irregular arcing occurs at a welding point or on an upstream side thereof.

That is, the present invention provides the following aspects.

(1) According to an aspect of the present invention, there is provided a welding monitoring apparatus that monitors a welding state of a V-convergence region in which a strip-shaped metal sheet is converged in a V-shape, when the metal sheet is cylindrically formed while being conveyed, and both side edges of the metal sheet are heated and melted in a manner of being butted each other while being converged in the V-shape, such that an electric resistance welded steel pipe is manufactured. The welding monitoring apparatus includes: an image capturing unit that captures images of a region including the V-convergence region in time series; and an image processing unit that extracts a welding point based on the images captured in time series and detects the presence or absence and the position of irregular arcing at a welding point or on an upstream side of the welding point.

(2) The aspect according to (1) may be constituted as follows. The images captured by the image capturing unit are RGB images. The image processing unit extracts at least one of a red image and a blue image from the RGB images, performs inverted binarization and labeling of the red image with respect to the red image, and detects a high-luminance portion in the blue image with respect to the blue image.

(3) In the aspect according to (1) or (2), the image capturing unit may be a camera capturing 200 frames or more per second.

(4) In addition, according to another aspect of the present invention, there is provided a welding monitoring method for monitoring a welding state of a V-convergence region in which a strip-shaped metal sheet is converged in a V-shape, when the metal sheet is cylindrically formed while being conveyed, and both side edges of the metal sheet are heated and melted in a manner of being butted each other while being converged in the V-shape, such that an electric resistance welded steel pipe is manufactured. The welding monitoring method includes: an image capturing step of capturing images of a region including the V-convergence region in time series; and a detecting step of extracting a welding point based on the images captured in time series and detecting the presence or absence and a position of irregular arcing at the welding point or on an upstream side of the welding point.

(5) The aspect according to (4) may be constituted as follows. RGB images are used as the images. In the detecting step, at least one of a red image and a blue image is extracted from the RGB images, inverted binarization and labeling of the red image are performed with respect to the red image, and a high-luminance portion in the blue image is detected with respect to the blue image.

(6) In the aspect according to (4) or (5), in the image capturing step, images may be captured at a frame rate of 200 frames or more per second.

(7) The aspect according to any one of (4) to (6) may further include a marking step of marking the position of the irregular arcing in a longitudinal direction in the electric resistance welded steel pipe.

(8) In the case of (7), the aspect may further include a defect presence-or-absence specifying step of performing an ultrasonic test with respect to a region to which the marking is applied.

(9) The aspect according to any one of (4) to (6) may further include a tracking step of tracking the position of the irregular arcing in a longitudinal direction in the electric resistance welded steel pipe.

As a camera to be used in the image capturing unit and the image capturing step, any of a monochrome camera and a color camera can be used. However, in a case where the aspects of (2) and (5) are employed, it is preferable to use a color camera which can perform color separation so as to distinguish light emission from a molten steel and irregular arcing from each other with high contrast.

Effects of the Invention

According to the welding monitoring apparatus and the welding monitoring method of each of the aspects of the present invention, it is possible to detect a defect which is generated due to a foreign substance caught on a welding surface, including a relatively light defect. Then, this detection information can be tracked in a step of manufacturing an electric resistance welded steel pipe, or marking can be performed on a steel pipe itself immediately after a defect is detected. In this case, a defect portion is unerringly eliminated from a product, so that only a normal portion having no caught-in defect can be shipped as a product.

BRIEF DESCRIPTION OF THE DRAWINGS

FIGS. 5A-5D are photographs showing an example of an image of an image processing process for detecting generation of a defect.

FIGS. 7A and 7B are views showing an example in which a defect-generated position and a portion where a crack is generated through a flattening test are butted each other.

An embodiment of a welding monitoring apparatus and a welding monitoring method for an electric resistance welded steel pipe according to the present invention will be described below with reference to the drawings.

Figure 3:
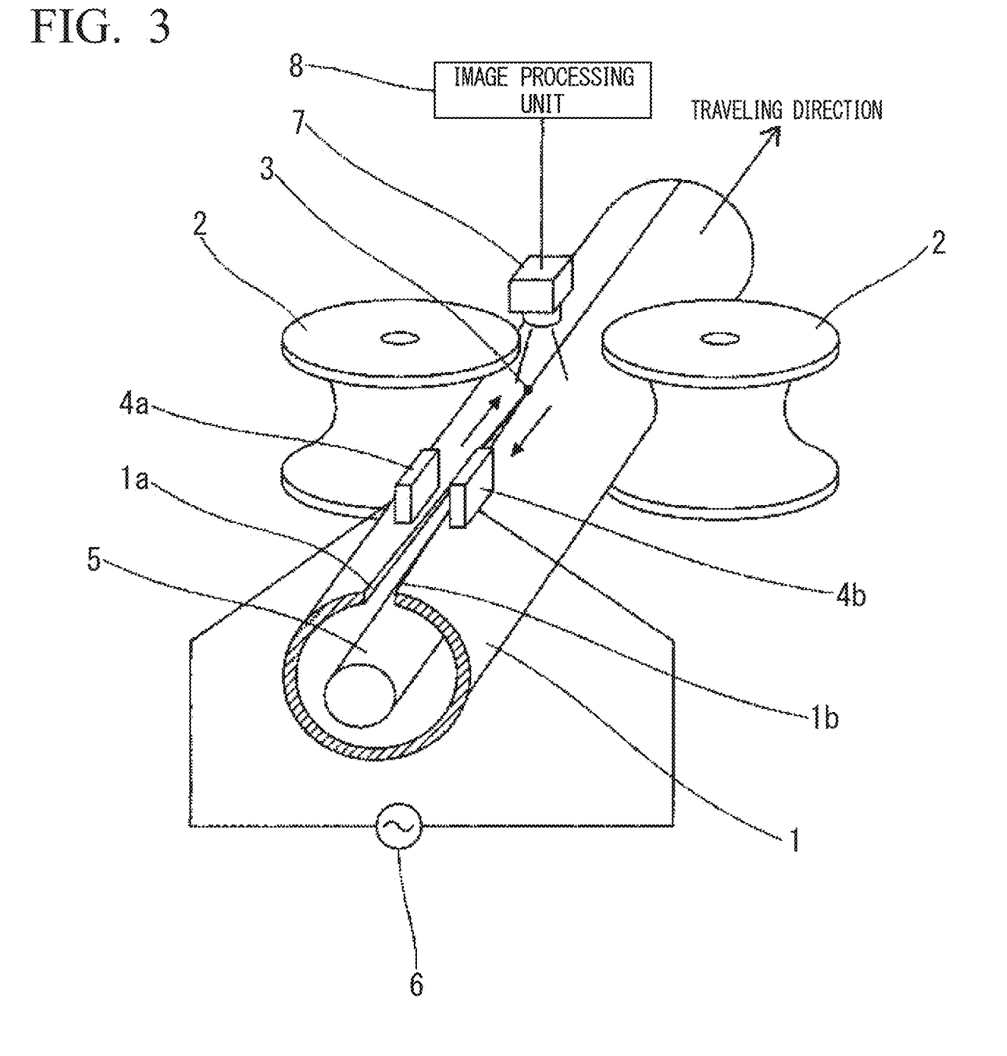
FIG. 3 is a perspective view showing an electric resistance welded steel pipe welding apparatus in which a welding monitoring apparatus and a welding monitoring method according to an embodiment of the present invention are applied.

FIG. 3 shows a perspective view of an electric resistance welded steel pipe welding apparatus in which the same welding monitoring apparatus and the same welding monitoring method are applied. The same electric resistance welded steel pipe welding apparatus is an apparatus which manufactures an electric resistance welded steel pipe by cylindrically forming a strip-shaped metal sheet 1 while the strip-shaped metal sheet 1 is conveyed along its longitudinal direction, and heating and melting both side edges (edges) 1a and 1b of the metal sheet 1 in a manner of being butted each other while the side edges are converged in a V-shape in a plan view. The reference sign 3 indicated in FIG. 3 is a V-convergence point at which both the side edges 1a and 1b converged in the V-shape are butted each other and are heated and melted. In this FIG. 3, the metal sheet (steel sheet) 1 proceeds from the front side on the paper toward the deep side on the paper along its longitudinal direction. Therefore, in a case where the V-convergence point 3 is taken as a reference, the front side on the paper becomes an upstream side, and the deep side on the paper becomes a downstream side.

The welding monitoring apparatus of the present embodiment monitors a welding state of a V-convergence region in which the metal sheet 1 is converged in a V-shape, when an electric resistance welded steel pipe is manufactured.

The reference signs 4a and 4b in FIG. 3 indicate a pair of contact tips disposed to come into contact with spots near both the side edges 1a and 1b of the metal sheet 1 in the circumferential direction, which travels toward the V-convergence point 3. In addition, the reference sign 5 in FIG. 3 indicates an impeder which is disposed in a central part of the cylindrically formed metal sheet 1, and the reference sign 6 indicates a high-frequency power supply which is connected to each of the contact tips 4a and 4b. High-frequency currents supplied through the contact tips 4a and 4b flow as indicated with arrows along the extending direction of both the side edges 1a and 1b in the circumferential direction of the metal sheet 1, so that both the side edges 1a and 1b of the metal sheet 1 are heated and melted due to high-frequency resistance. Similar to that in the related art, a heat input is controlled by means of these high-frequency currents. A pair of squeeze rolls 2 and 2 near the V-convergence point 3 apply an upset to both the side edges 1a and 1b of the metal sheet 1 which have been heated and melted such that both the side edges 1a and 1b are subjected to electric resistance welding. Instead of high-frequency resistance welding using the contact tips 4a and 4b, an induction heating-type welding in which heating is performed by using an induction coil can also be employed.

The squeeze rolls 2 and 2 apply an upset to both the side edges 1a and 1b of the metal sheet 1 which have been heated and melted in this manner, so that oxide on a surface of the metal sheet 1 is extruded and discharged from a welding surface, and thereby excellent welding quality is achieved. However, as described above, if a foreign substance is caught on the welding surface, strength of the welding surface is degraded, and a possibility of a crack at the time of working of a steel pipe or when an internal pressure is applied to a steel pipe increases.

The welding monitoring apparatus of the present embodiment includes an image capturing unit 7 and an image processing unit 8 in order to monitor a caught-in defect in real time including a light defect which have not been able to be monitored in the related art. According to this welding monitoring apparatus, irregular arcing (arcing into which a foreign substance is incorporated) which has occurred in a weld or on an upstream side of the weld is detected, and thus a defect portion in an electric resistance welded steel pipe can be specified. Irregular arcing differs from the steady state arcing described above in regard to the following points. That is, steady state arcing occurs on a downstream side of a weld (V-convergence point 3). On the other hand, irregular arcing occurs in a weld (V-convergence point 3) and on an upstream side of a weld (V-convergence point 3). In addition, steady state arcing occurs between a pair of end edges (edges) when an electric resistance welded steel pipe is formed. Therefore, the material of a welded portion generated as a result thereof is equivalent to the base material of the metal sheet 1. In contrast, in a case of irregular arcing, it occurs due to a foreign substance such as iron oxide (scale) or iron powder. Therefore, the material of a welded portion differs from the base material of the metal sheet 1.

The image capturing unit 7 captures an image of a surface of a region including the V-convergence region in which both the side edges 1a and 1b of the metal sheet 1 are converged in a V-shape. For example, a CCD camera is used. The image capturing apparatus is disposed above a weld (V-convergence point 3) such that a range including a weld (V-convergence point 3) and the upstream side of the weld (V-convergence point 3) can be captured from above thereof. Since such a way of disposing the image capturing apparatus above is employed, for example, even in a case of being applied to a small-diameter line, the image capturing apparatus can be installed without hardship and without interfering with other equipments (a nitrogen purge nozzle, a cooling water piping, and the like).

In the metal sheet 1, since both the side edges 1a and 1b thereof are intensively heated and melted, radiant light is emitted from both the side edges 1a and 1b and places in the vicinity thereof. From this radiant light, the image capturing unit 7 captures an image on a surface of the metal sheet 1 including red light.

Figure 4:
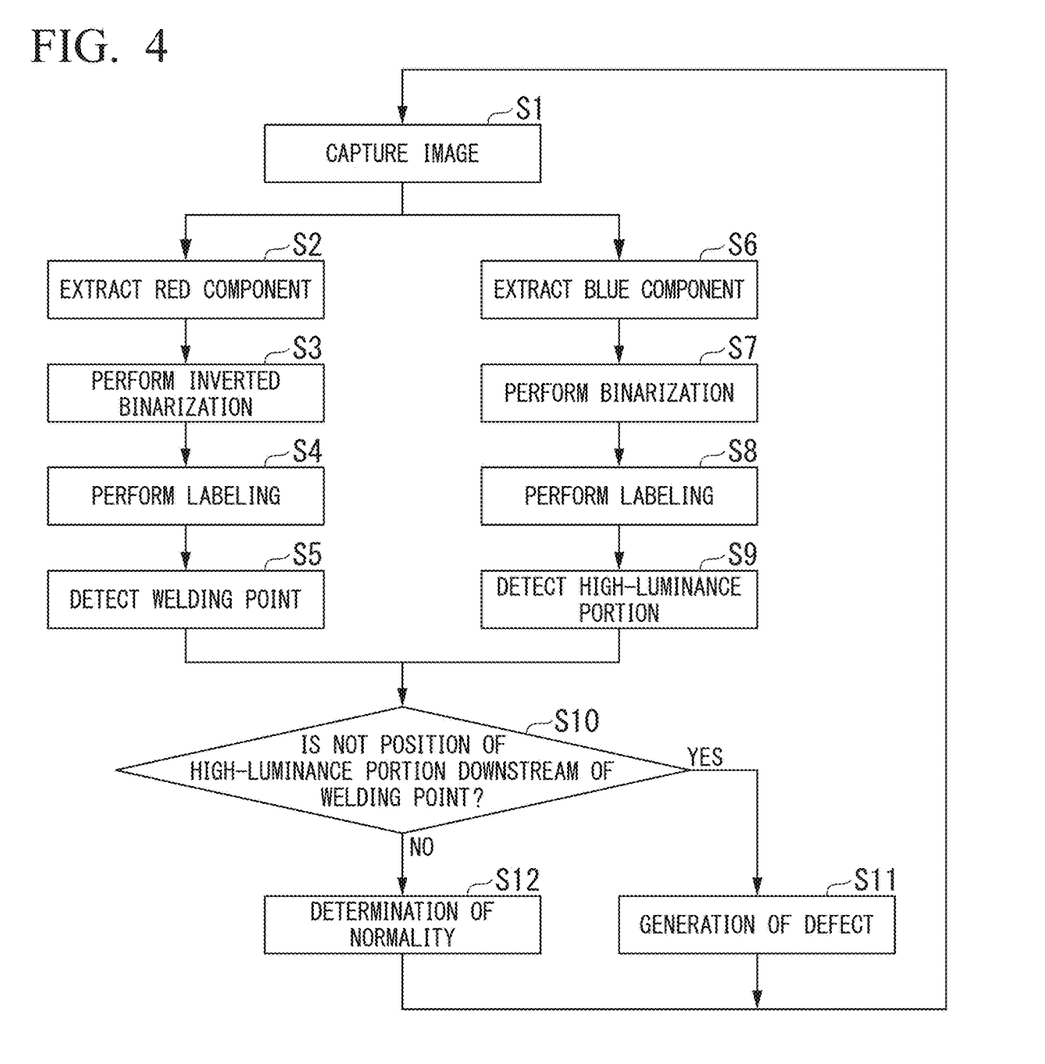
FIG. 4 is a flowchart of an image processing algorithm for detecting generation of a defect by using the same welding monitoring apparatus and the same welding monitoring method.

FIG. 4 shows an image processing algorithm for automatically performing detection using the image capturing unit 7 and the image processing unit 8. In addition, FIGS. 5A-5D show examples of processed images.

At least one of a red component and a blue component is extracted from an RGB image (refer to FIG. 5A) captured in Step S1 of FIG. 4 (FIG. 4 shows an example of a case where both are extracted).

Figure 5A:
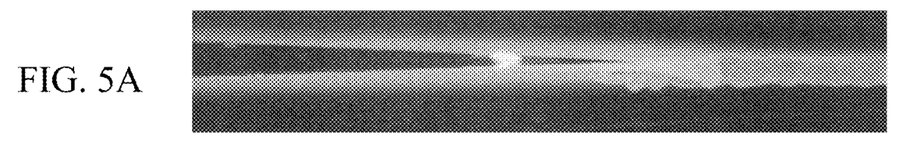
FIG. 5A shows a captured image.
Figure 5B:
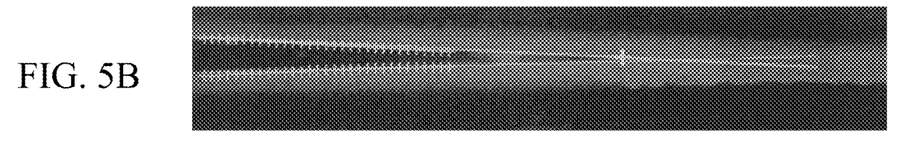
FIG. 5B shows a detected welding point.
Figure 5C:
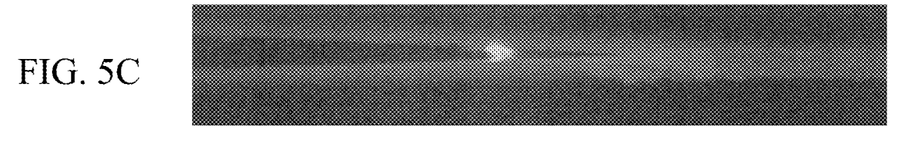
FIG. 5C shows a detected blue component.

When a red component shown in Step S2 is extracted, inverted binarization (Step S3) and labeling (Step S4) are performed to obtain a welding point in a red image, and a downstream end point in a wedge-type region interposed between steel edges (both the side edges 1a and 1b) is set as the welding point (Step S5, also refer to FIG. 5B).

Figure 5D:
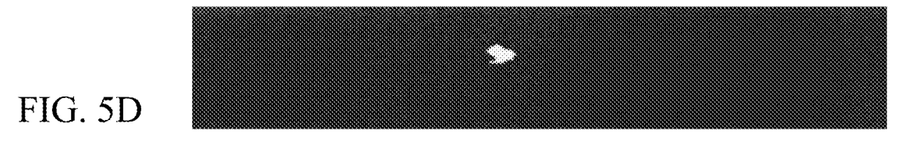
FIG. 5D shows a detected high-luminance portion.

On the other hand, when a blue component shown in Step S6 is extracted, a blue image is subjected to binarization (Step S7, also refer to FIG. 5C) and labeling (Step S8), and a high-luminance portion is detected (Step S9, also refer to FIG. 5D). In the present image in which a radiant pattern of a molten steel is captured, in a case where irregular arcing is present in spite of the low level of the blue component, the blue component exhibits high luminance and can be detected. Here, high luminance indicates a level of 200 or higher in 255 gradations, for example. This high-luminance portion is subjected to labeling (the foregoing Step S8), and positional information is derived out. Labeling indicates processing in which the same label number is attached to one lump (blob) in a binary image, a particular blob is extracted, and the position (the maximum point and the minimum point of the X-coordinate, and the maximum point and the minimum point of the Y-coordinate), the width, the length, the area, and the like of the blob within the image are extracted. Even if a plurality of irregular arcing portions are present, the positional information of each thereof can be derived out.

The position of the welding point and the high-luminance portion obtained in this manner are compared to each other in Step S10. If the position of the high-luminance portion is not on a downstream side of the welding point (Step S10: YES), generation of an irregular arcing portion is determined as generation of a defect (Step S11), and the processing returns to Step S1. On the other hand, if the position of the high-luminance portion is on a downstream side of the welding point (Step S10: NO), it is determined as normal (Step S12), and the processing subsequently returns to Step S1.

As described above, a defect can be determined at all times. Here, a blue component image is extracted and processed in order to detect an irregular arcing portion with high contrast. However, since an irregular arcing portion is also saturated (Level 255 in 255 gradations) even in a red component image with high probability, only a red component can also be detected.

If a camera capturing 200 frames or more per second is used when an image is captured, it is experimentally ascertained that there is no leakage in detection of an irregular arcing portion. Therefore, it is preferable to use a camera capturing 200 frames or more per second when an image is captured in Step S1.

Hereinafter, Examples of the present invention will be described.

EXAMPLES

In an actual manufacturing line, the positions of a welding point were measured while continuously capturing images of a weld and performing image processing. The pipe adopted as a welding monitoring target was an actual pipe of φ100 mm×4 mmt. In the camera used for capturing images, the frame rate was set to 200 frames/second, and the exposure time was set to $1/10{,}000$ seconds.

Figure 6:
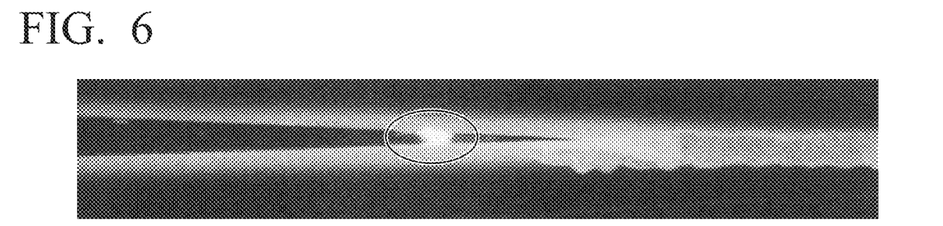
FIG. 6 is a photograph in which a state of a weld at the time of generation of a defect is image-captured.

FIG. 6 shows an example of welding monitoring. In the image of FIG. 6 captured at the time of generation of a defect, when a pair of welding surfaces (edges) approached each other, the welding surfaces were short-circuited due to a foreign substance such as scale or iron powder having conductivity, and thus irregular arcing occurred. In places where no foreign substance adhered, no irregular arcing occurred even when the welding surfaces approached each other, and it could be checked that no defect was generated.

Figure 7A:
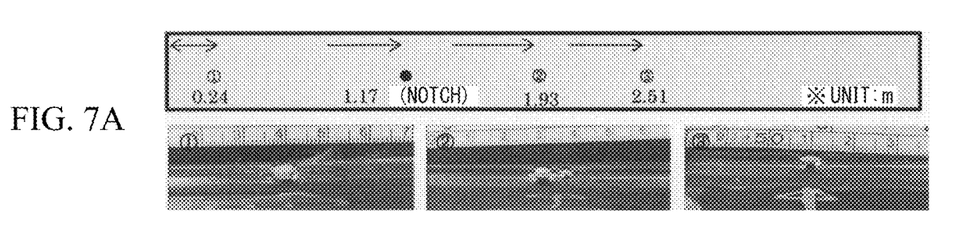
FIG. 7A is a photograph showing an actual defect portion checked after the flattening test and the external appearance thereof.
Figure 7B:
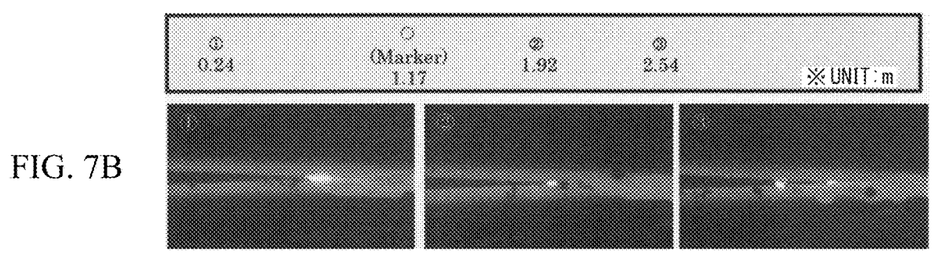
FIG. 7B shows comparison between a portion where irregular arcing has occurred and an image.

An example in which this phenomenon and generation of a defect are butted is shown in FIGS. 7A and 7B.

In FIG. 7A, actual defect portions in which a crack has been generated after a flattening test, and photographs of the external appearance respectively corresponding to these actual defect portions are shown. It is ascertained that a crack has been generated in three places of 0.24 m, 1.93 m, and 2.51 m from a steel pipe head. A "notch" at a position of 1.17 m indicates a portion in which a notch has been made in the edge in advance as a marker for tracking. This marker was used as a reference position for specifying the position along the longitudinal direction of the actual pipe.

In FIG. 7B, among captured images, images of the portion in which irregular arcing has occurred in the welding point or on an upstream side thereof and the corresponding portions are butted each other are shown. An image of the marker was also able to be checked (not shown). Therefore, it is ascertained that each generation portion corresponds extremely well to the flat crack portion. Since images other than the corresponding portions did not have irregular arcing and any other abnormality, thereby being normal, it was actually verified that generation of a defect was accompanied by irregular arcing.

The main points of the welding monitoring apparatus and the welding monitoring method according to the embodiment described above will be summarized below.

(1) The welding monitoring apparatus of the present embodiment monitors the welding state of the V-convergence region in which the strip-shaped metal sheet 1 is converged in a V-shape, when the metal sheet 1 is cylindrically formed while being conveyed along its longitudinal direction, and both the side edges 1a and 1b of the metal sheet 1 are heated and melted in a manner of being butted each other while being converged in the V-shape, such that an electric resistance welded steel pipe is manufactured. Then, this welding monitoring apparatus includes: the image capturing unit 7 that captures images of a region including the V-convergence region in time series; and the image processing unit 8 that extracts a welding point based on the images captured in time series and detects the presence or absence and the position of irregular arcing at the welding point or on an upstream side of the welding point.

(2) The welding monitoring apparatus according to (1) is constituted as follows. The images captured by the image capturing unit 7 are RGB images. The image processing unit 8 extracts at least one of a red image and a blue image from the RGB images, performs inverted binarization and labeling of the red image with respect to the red image, and detects a high-luminance portion in the blue image with respect to the blue image.

(3) In the aspect according to (1) or (2), the image capturing unit is a camera capturing 200 frames or more per second.

(4) In addition, the welding monitoring method of the present embodiment is used for monitoring the welding state of the V-convergence region in which the strip-shaped metal sheet 1 is converged in a V-shape, when the metal sheet 1 is cylindrically formed while being conveyed along its longitudinal direction, and both the side edges 1a and 1b of the metal sheet 1 are heated and melted in a manner of being butted each other while being converged in the V-shape, such that an electric resistance welded steel pipe is manufactured. This welding monitoring method includes: an image capturing step of capturing images of a region including the V-convergence region in time series; and a detecting step of extracting a welding point based on the images captured in time series and detecting the presence or absence and the position of irregular arcing at the welding point or on an upstream side of the welding point.

(5) In the welding monitoring method according to (4), the followings are performed. RGB images are used as the images. In the detecting step, at least one of a red image and a blue image is extracted from the RGB images, inverted binarization and labeling of the red image are performed with respect to the red image, and a high-luminance portion in the blue image is detected with respect to the blue image.

(6) In the welding monitoring method according to (4) or (5), in the image capturing step, images are captured at a frame rate of 200 frames or more per second.

Moreover, the following steps in (7) and (8), or (9) can be performed.

(7) The welding monitoring method according to any one of (4) to (6) further includes a marking step of marking the position of the irregular arcing in the longitudinal direction in the electric resistance welded steel pipe.

(8) The welding monitoring method according to (7) further includes a defect presence-or-absence specifying step of performing an ultrasonic test with respect to a region to which the marking is applied.

(9) The aspect according to any one of (4) to (6) further includes a tracking step of tracking the position of the irregular arcing in the longitudinal direction in the electric resistance welded steel pipe.

According to the welding monitoring apparatus and the welding monitoring method described above, the presence or absence of a caught-in defect can be easily detected in real time by extracting a welding point and automatically determining the presence or absence of generation of irregular arcing in the vicinity of the welding point or on an upstream side of the welding point. Then, product-tracking is performed or a steel pipe is subjected to marking in the vicinity of the squeeze rolls 2 immediately after irregular arcing is detected, based on the information of the presence or absence of generation of irregular arcing, so that the position of a defect-generated portion is clarified, and thus the defect-generated portion can be easily eliminated in a refining step. Therefore, only a normal portion including no defect can be shipped as a product.

INDUSTRIAL APPLICABILITY

According to the present invention, it is possible to provide a welding monitoring apparatus and a welding monitoring method, in which a relatively light caught-in defect caused by an incorporated foreign substance such as scale powder or iron powder can be detected in real time in a welding step of an electric resistance welded steel pipe.

BRIEF DESCRIPTION OF THE REFERENCE SYMBOLS

1: metal sheet
1a, 1b: both side edges of metal sheet
2: squeeze roll
3: welding point
4a, 4b: contact tip
5: impeder
6: high-frequency power supply
7: image capturing unit
8: image processing unit

The invention claimed is:

1. A welding monitoring method for monitoring welding of a V-convergence region in which a strip-shaped metal sheet is converged in a V-shape, when the metal sheet is cylindrically formed while being conveyed in a longitudinal direction, and both side edges of the metal sheet are heated and melted in a manner of being butted each other while being converged in the V-shape, such that an electric resistance welded steel pipe is manufactured, the method comprising:
    an image capturing step of capturing images from above a region including the V-convergence region in a plan view in time series; and
    a detecting step of extracting a welding point based on the images captured from above in time series and detecting the presence or absence and a position of irregular arcing at the welding point or on an upstream side of the welding point,
    wherein RGB images are used as the images, and
    wherein in the detecting step,
        at least one of a red image and a blue image is extracted from the RGB images,
        inverted binarization and labeling of the red image are performed with respect to the red image, and
        a high-luminance portion in the blue image is detected with respect to the blue image.

2. The welding monitoring method according to claim 1, wherein in the image capturing step, images are captured at a frame rate of 200 frames or more per second.

3. The welding monitoring method according to claim 2, further comprising:
   a marking step of physically marking the position of the irregular arcing in a longitudinal direction in the electric resistance welded steel pipe.

4. The welding monitoring method according to claim 3, further comprising:
   a defect presence-or-absence specifying step of performing an ultrasonic test with respect to a region to which the marking is applied.

5. The welding monitoring method according to claim 2, further comprising:
   a tracking step of tracking the position of the irregular arcing in a longitudinal direction in the electric resistance welded steel pipe.

6. The welding monitoring method according to claim 1, further comprising:
   a marking step of physically marking the position of the irregular arcing in a longitudinal direction in the electric resistance welded steel pipe.

7. The welding monitoring method according to claim 6, further comprising:
   a defect presence-or-absence specifying step of performing an ultrasonic test with respect to a region to which the marking is applied.

8. The welding monitoring method according to claim 1, further comprising:
   a tracking step of tracking the position of the irregular arcing in a longitudinal direction in the electric resistance welded steel pipe.

\* \* \* \* \*